(12) United States Patent
Yang et al.

(10) Patent No.: US 8,171,380 B2
(45) Date of Patent: May 1, 2012

(54) ADAPTIVE SYSTEMS AND METHODS FOR STORING AND RETRIEVING DATA TO AND FROM MEMORY CELLS

(75) Inventors: Xueshi Yang, Sunnyvale, CA (US); Zining Wu, Los Altos, CA (US)

(73) Assignee: Marvell World Trade Ltd., St. Michael (BB)

( * ) Notice: Subject to any disclaimer, the term of this patent is extended or adjusted under 35 U.S.C. 154(b) by 1243 days.

(21) Appl. No.: 11/867,858

(22) Filed: Oct. 5, 2007

(65) Prior Publication Data

US 2008/0086677 A1    Apr. 10, 2008

Related U.S. Application Data

(60) Provisional application No. 60/828,922, filed on Oct. 10, 2006.

(51) Int. Cl.
*H03M 13/00* (2006.01)
(52) U.S. Cl. .................... 714/774; 714/763
(58) Field of Classification Search .......... 365/52, 365/63; 382/219; 711/170; 714/718, 723, 714/733, 774, 763
See application file for complete search history.

(56) References Cited

U.S. PATENT DOCUMENTS

| | | | |
|---|---|---|---|
| 6,366,487 B1 * | 4/2002 | Yeom | 365/52 |
| 6,438,518 B1 * | 8/2002 | Manjunath et al. | 704/219 |
| 6,954,555 B2 * | 10/2005 | Shimada | 382/246 |
| 7,420,831 B2 * | 9/2008 | Seo et al. | 365/63 |
| 7,707,380 B2 * | 4/2010 | Spielberg et al. | 711/170 |
| 2003/0005385 A1 | 1/2003 | Stieger | |
| 2005/0172179 A1 | 8/2005 | Brandenberger et al. | |

FOREIGN PATENT DOCUMENTS

| | | |
|---|---|---|
| EP | 1 427 110 A2 | 6/2004 |
| WO | WO03/100791 A1 | 12/2003 |
| WO | WO2006/013529 A1 | 2/2006 |

* cited by examiner

*Primary Examiner* — David Ton

(57) ABSTRACT

Adaptive systems and methods that may help assure the reliability of data retrieved from memory cells are described herein. The systems may include a memory device including a plurality of memory cells, a data quality monitoring block, and an adaptive data encoding block, the data quality monitoring block and the adaptive data encoding block both being operatively coupled to the memory device. The data quality monitoring block may be configured to determine a quality value of a group of one or more memory cells included in the memory device, the determined quality value being indicative of a quality of the group of one or more memory cells. The adaptive data encoding block may be configured to select a coding scheme from a plurality of coding schemes to encode data to be written to the group of one or more memory cells in the memory device, the selection of the coding scheme being based at least in part on the determined quality value of the group of one or more memory cells.

53 Claims, 6 Drawing Sheets

Threshold voltage distributions

FIG. 6

Table 1

| # of errors corrected per logical block/sector | [0, T/10] | [T/10, T/5] | [T/5, T/2] | [T/2, T] | > T |
|---|---|---|---|---|---|
| Quality index | 0 | 1 | 2 | 3 | 4 |

FIG. 7

Table 2

| Block/sector index | Most recently measured quality index | Quality index used for writing |
|---|---|---|
| 0 | 1 | 0 |
| 1 | 1 | 1 |
| 2 | 0 | 0 |
| 3 | 2 | 2 |
| 4 | 3 | 0 |

* Block/sector = group of one or more memory cells

ADAPTIVE SYSTEMS AND METHODS FOR STORING AND RETRIEVING DATA TO AND FROM MEMORY CELLS

CROSS-REFERENCES TO RELATED APPLICATIONS

The present application claims priority to U.S. Patent Application No. 60/828,922, filed Oct. 10, 2006, entitled "Adaptive Coding System and Methods for Storage Devices," the entire disclosure of which is hereby incorporated by reference in its entirety for all purposes.

TECHNICAL FIELD

Embodiments of the present invention relate to the field of data memory devices, and more particular, to the storage and retrieval of data to and from memory cells.

BACKGROUND

During the life cycle of memory devices, for example, flash memory devices, such devices are subject to wear and tear due to normal usage. From a signal processing/coding point of view, this implies that the communication channel quality degrades over time, which may eventually affect data reliability of the device. For example, flash memory devices are typically exposed to reliability related issues, such as read disturb, endurance, and retention, as the memory cells cycle through multiple read and/or write operations.

FIG. 1 illustrates the relative threshold voltage distribution of flash memory cells before and after cycling through multiple read and write operations. In particular, FIG. 1 shows the relative voltage distributions before cycling after cycling. The two sets of distributions depicted in FIG. 1 may be interpreted as representations of logic 0 and logic 1, respectively, before and after the memory cells have been cycled.

Notice that after cycling, the separation of the two distributions decreases and each of the distributions become wider. Consequently, the capability for distinguishing whether 0 or 1 is stored in a flash cell degrades after cycling, resulting in data reliability degradation. In the flash memory industry, this phenomenon is often referred to as retention loss. Although an advanced signal processing algorithm may be devised to track the retention loss and mitigate the undesired effects, it may be critical that the degradation of memory cells remains entirely transparent to the user. In other words, from the user's point of view, the data reliability level should be guaranteed throughout the entire lifespan of the device without significant functionality alteration and/or user intervention.

SUMMARY OF INVENTION

According to various embodiments of the present invention, adaptive memory read and write systems and methods are provided that adapt to memory cell degradation as a result of, for example, repeated cycling. The systems may include a memory device including a plurality of memory cells, a data quality monitoring block, and an adaptive data encoding block. The data quality monitoring block and the adaptive data encoding block may cooperatively work together to select appropriate coding schemes for writing data into the memory cells of the memory device. For example, the data quality monitoring block may be configured to determine a first quality value of a first group of one or more memory cells included in the memory device, the determined first quality value being indicative of a quality of the first group of one or more memory cells. On the other hand, the adaptive data encoding block may be configured to select a first coding scheme from a plurality of coding schemes to encode data to be written to the first group of one or more memory cells, the selection of the first coding scheme being based at least in part on the determined first quality value of the first group of one or more memory cells.

In some embodiments of the present invention, the data quality monitoring block may be further configured to determine a second quality value of a second group of one or more memory cells included in the memory device, the second quality value being indicative of the quality of the second group of one or more memory cells. For these embodiments, the adaptive data encoding block may be configured to select a second coding scheme from the plurality of coding schemes to encode data to be written to the second group of one or more memory cells, the selection of the second coding scheme being based at least in part on the second quality value of the second group of one or more memory cells. The selected first and second coding schemes may be the same or different coding schemes.

In various embodiments, if the first quality value is a higher quality value than the second quality value, then the first coding scheme is selected such that the first coding scheme has a lower error correction capability than the second coding scheme.

In addition to the memory device, the data quality monitoring block, and the adaptive data encoding block, the systems may further include additional components. For example, the systems may further include a read blockconfigured to read the memory cells included in the memory device. For these systems, the data quality monitoring block may be operatively coupled to the memory device via the read block. The systems may further include a write block configured to write encoded data received from the adaptive data encoding block to the memory cells of the memory device.

The systems may further include a quality map configured to store the first quality value of the first group of one or more memory cells as well as the second quality value of the second group of one or more memory cells determined by the data quality monitoring block. The quality map may also be configured to provide to the adaptive data encoding block, the first quality value for the first group of one or more memory cells. In some embodiments of the present invention, the quality map may be configured to include, at any given moment in time, an additional quality value of the first group of one or more memory cells along with the first quality value of the first group of one or more memory cells, the additional quality value being stored in the quality map prior to the storing of the first quality value. The quality map may be further configured to store and provide to the adaptive data encoding block, at least one quality value for at least one group of one or more memory cells in the memory device that indicates that the at least one group of one or more memory cells is, or are, to be excluded from being used.

The systems, in accordance with various embodiments of the present invention, may further include a signal processing and detection block, and an error correction and decoding block. The signal processing and detection block may be configured to process, and the error correction and decoding block may be configured to decode, respectively, data read by the read block from the first group of one or more memory cells. For these embodiments of the present invention, the quality map may be further configured to provide the additional quality value of the first group of one or more memory cells to the signal processing and detection block to facilitate the processing of the data read by the read block. The quality map may also be further configured to provide the additional quality value to the error correction and decoding block to facilitate the decoding of the data. These and other aspects of various embodiments of the present invention will now be described in greater detail below.

BRIEF DESCRIPTION OF THE DRAWINGS

The present invention will be described by way of exemplary embodiments, but not limitations, illustrated in the accompanying drawings in which like references denote similar elements, and in which:

FIG. 6 illustrates an exemplary quality monitoring function table, in accordance with various embodiments of the present invention;

FIG. 7 illustrates a table that represents an exemplary structure of a quality map, in accordance with various embodiments of the present invention.

DETAILED DESCRIPTION

In the following detailed description, reference is made to the accompanying drawings which form a part hereof wherein like numerals designate like parts throughout, and in which is shown by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments in accordance with the present invention is defined by the appended claims and their equivalents.

Various operations may be described as multiple discrete operations in turn, in a manner that may be helpful in understanding embodiments of the present invention; however, the order of description should not be construed to imply that these operations are order dependent.

For the purposes of the instant description, the phrase "A/B" means A or B. For the purposes of the instant description, the phrase "A and/or B" means "(A), (B), or (A and B)." For the purposes of the instant description, the phrase "at least one of A, B and C" means "(A), (B), (C), (A and B), (A and C), (B and C) or (A, B and C)." For the purposes of the instant description, the phrase "(A)B" means "(B) or (AB)," that is, A is an optional element.

The description may use the phrases "in various embodiments," or "in some embodiments," which may each refer to one or more of the same or different embodiments. Furthermore, the terms "comprising," "including," "having," and the like, as used with respect to embodiments of the present invention, are synonymous.

Figure 1:
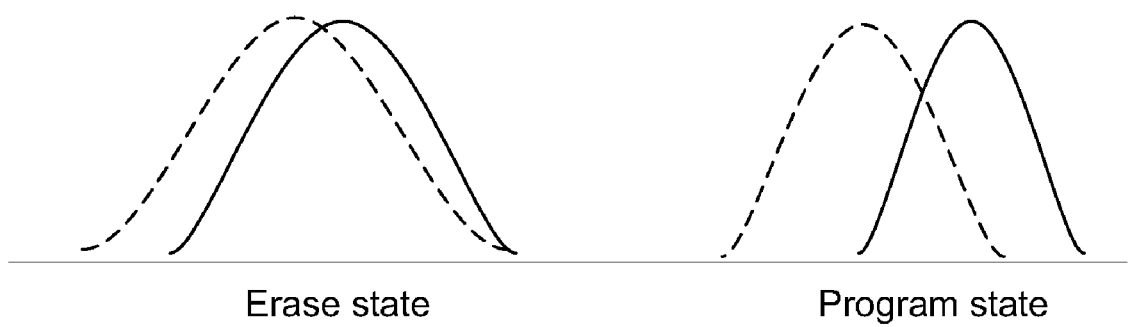
FIG. 1 illustrates a relative threshold voltage distribution of prior art Flash memory cells before and after cycling through multiple read and write operations.
Figure 2:
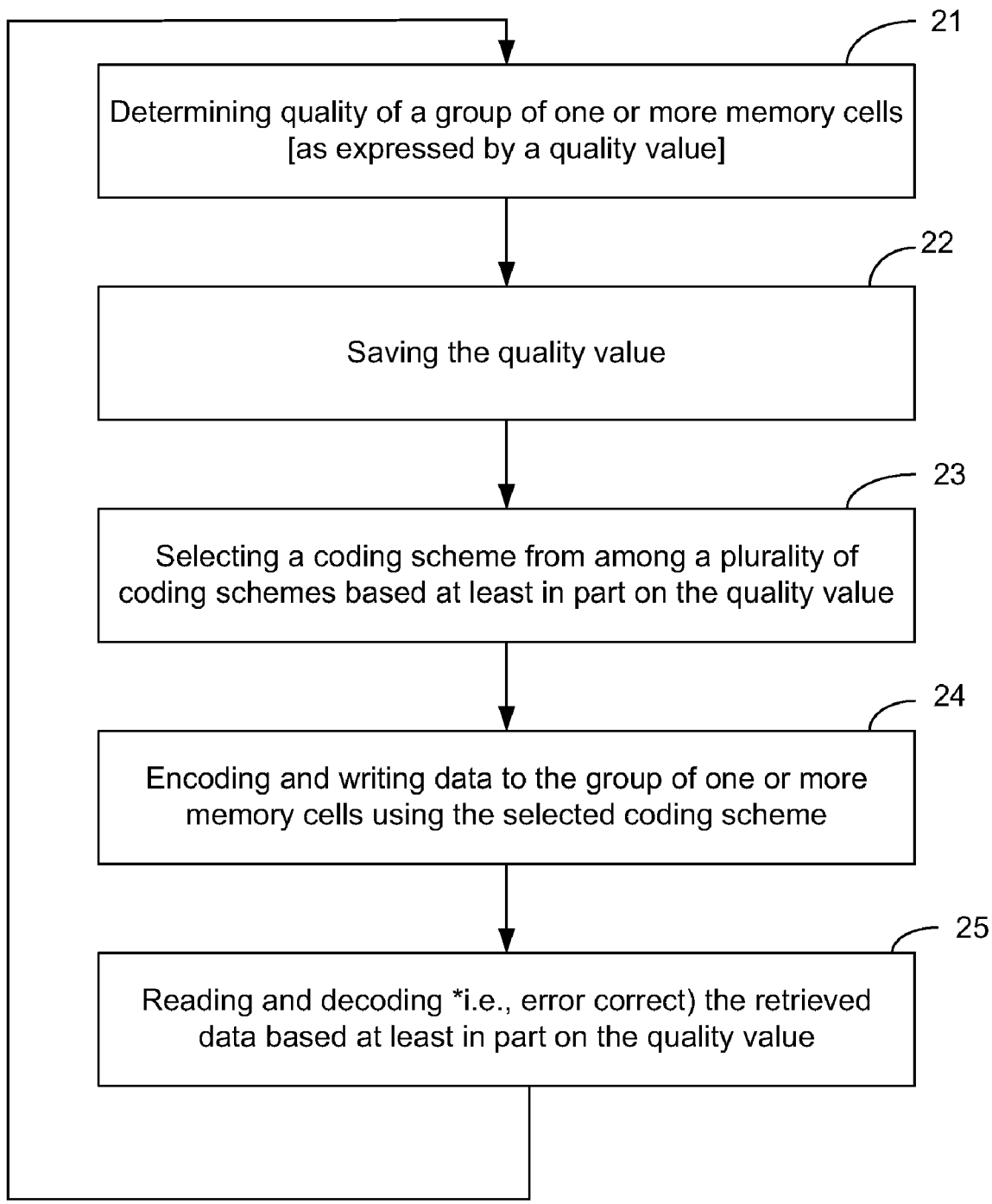
FIG. 2 illustrates a process for writing and reading data to groups of memory cells of a memory device, in accordance with various embodiments of the present invention.

Embodiments of the present invention are directed to systems and methods that may help assure the reliability of data retrieved from memory cells. Memory devices, such as flash memory devices, typically comprise many individual memory cells, which in some instances, may be multi-level memory cells. As previously described, the relative threshold voltage distribution of such memory cells may change over time through repeated cycling thereby resulting in the degradation of data reliability of the memory devices. FIG. 2 depicts a process for assuring the reliability of data retrieved from memory cells of a memory device in accordance with various embodiments of the present invention. In particular, the process 20 is a process for writing to and reading from a group of one or more memory cells (herein "group of memory cells") of a memory device that may assure the reliability of data retrieved from the group of memory cells. Such a process 20 may be repeatedly performed over and over again for each group (i.e., block or sector) of memory cells in the memory device. As used herein, a group of memory cells may include one or more memory cells.

The process 20 may initially begin when a quality of a group of memory cells of a memory device is determined at 21. As will be described in greater detail herein, the quality of the group of memory cells may be determined during a read operation of data previously stored in the group of memory cells. The quality of the group of memory cells, in various embodiments, may be expressed by a quality value such as quality index. Various alternative approaches, which will be described herein, may be employed in order to determine the quality value of a group of memory cells. The terms "quality," "highest quality," and "lowest quality," as will be used below when referring to groups of memory cells are relative terms and thus, may only have significance with respect to the methods used in determining such qualities. After determining the quality value of the group of memory cells, the determined quality value may be saved at 22. In some embodiments of the present invention in which certain methods are employed for determining a quality value, a quality value may only be determined for a plurality of memory cells rather than for a single memory cell.

Based at least in part on the quality value determined, an appropriate coding scheme or algorithm from among a plurality of eligible coding schemes or algorithms (herein "schemes") may be selected for encoding data to be written to the group of memory cells at 23. For example, suppose the determined quality value is expressed by a quality index that may have any value between the value of 0 and 4, where a quality index value of 0 indicates that the quality of the group of memory cells having such a quality value is of the highest quality, while a quality index of 4 indicates that the group of memory cells having such a quality value is of the worst quality. Thus, if a group of memory cells is determined to have a relatively poor quality, such as having a quality index value of 3, for example, this may result in the selection of a coding scheme from the plurality of coding schemes that has lots of redundancy built-in in order to account for errors that may arise when reading data from a group of memory cells having poor quality.

After selecting the appropriate coding scheme, the selected coding scheme may be used to encode data to be written to the group of memory cells at 24. When it is time to read or retrieve the encoded data from the group of memory cells, the saved quality value may be used in order to properly process and decode the encoded data retrieved from the group of memory cells at 25. As a result of the decoding process, the retrieved data may be properly error corrected. This process 20 may be repeated over and over again for each group of memory cells in a memory device.

Figure 3:
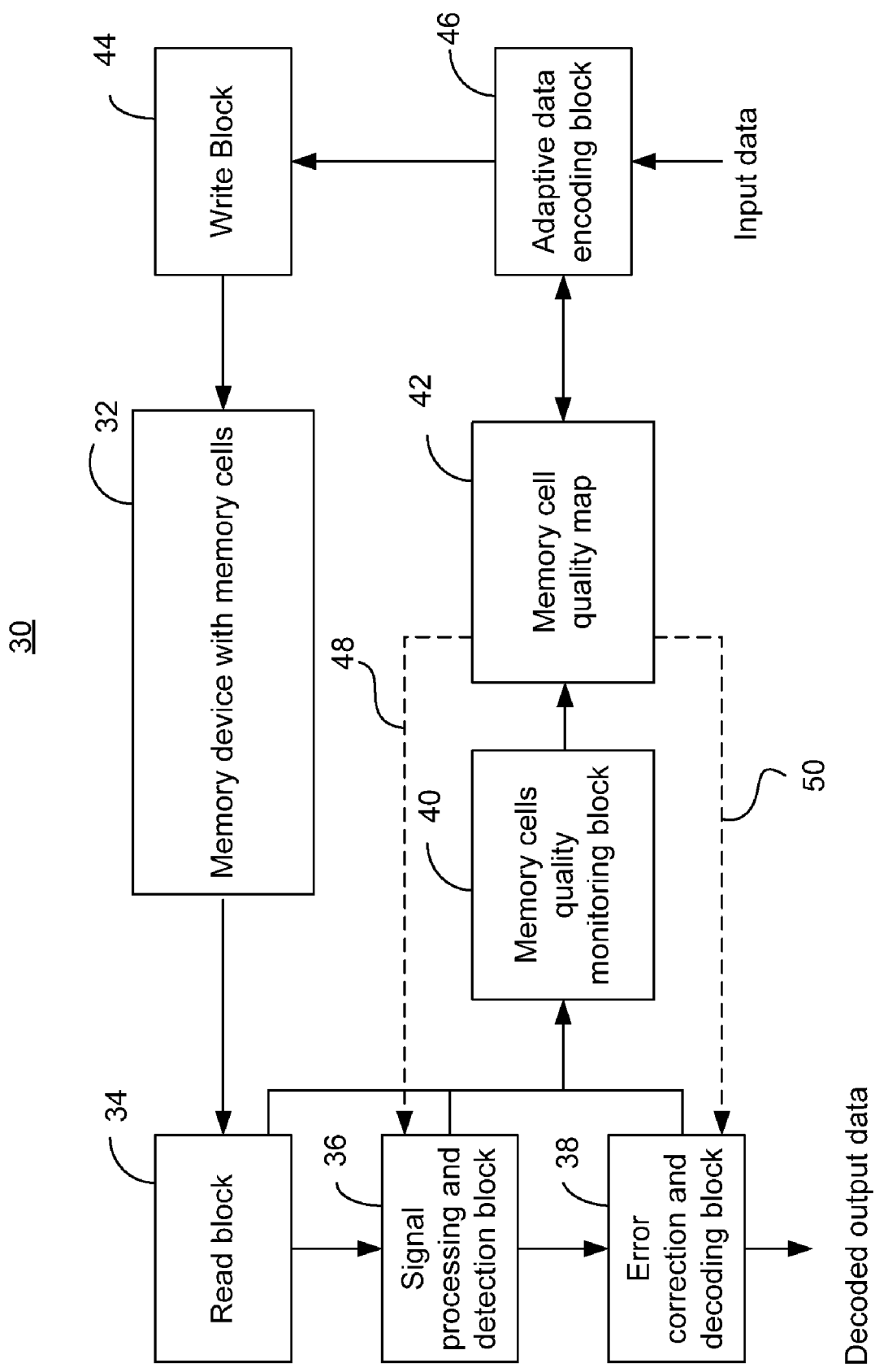
FIG. 3 illustrates a read/write system for a memory device, in accordance with various embodiments of the present invention.

FIG. 3 depicts an example of a read/write system for a memory device in accordance with various embodiments of the present invention. The read/write system (herein "system") 30 includes a memory device with memory cells (herein "memory device") 32, a read block 34, a signal processing and detection block 36, an error correction and decoding block 38, memory cells quality monitoring block 40, memory cell quality map 42, a write block 44, and an adaptive data encoding block 46 operatively coupled together. In some embodiments of the present invention, the memory cells included in the memory device 32 may be flash memory cells such as, but not limited to, multi-level memory cells. Various components of the system 30 may be implemented using a combination of hardware, such as application specific integrated circuit (ASIC), and/or software. Further, in some alternative embodiments of the present invention, one or more of the depicted components may be absent while in other or the same embodiments, additional components not depicted may be included. The system 30 may be divided into two portions, a read portion and a write portion, which are depicted in FIGS. 4 and 5, respectively.

Figure 4:
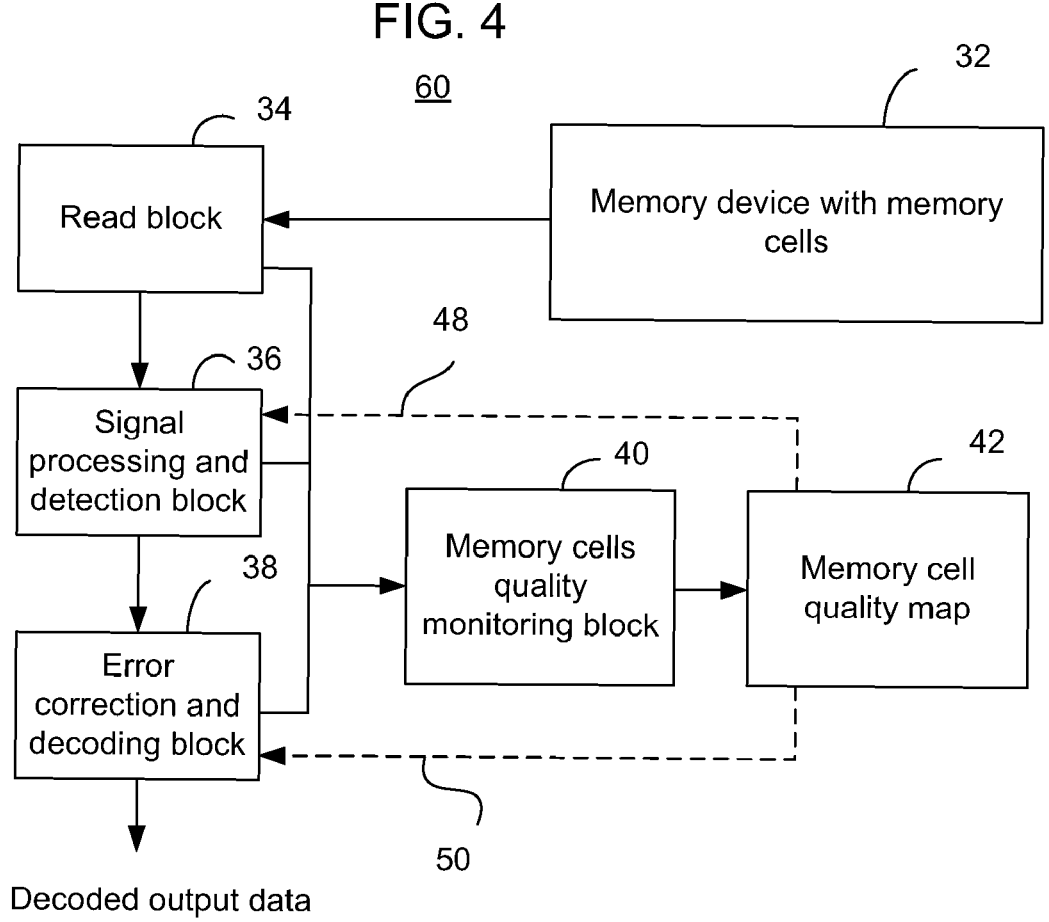
FIG. 4 illustrates a read portion of the system of FIG. 3, in accordance with various embodiments of the present invention.
Figure 5:
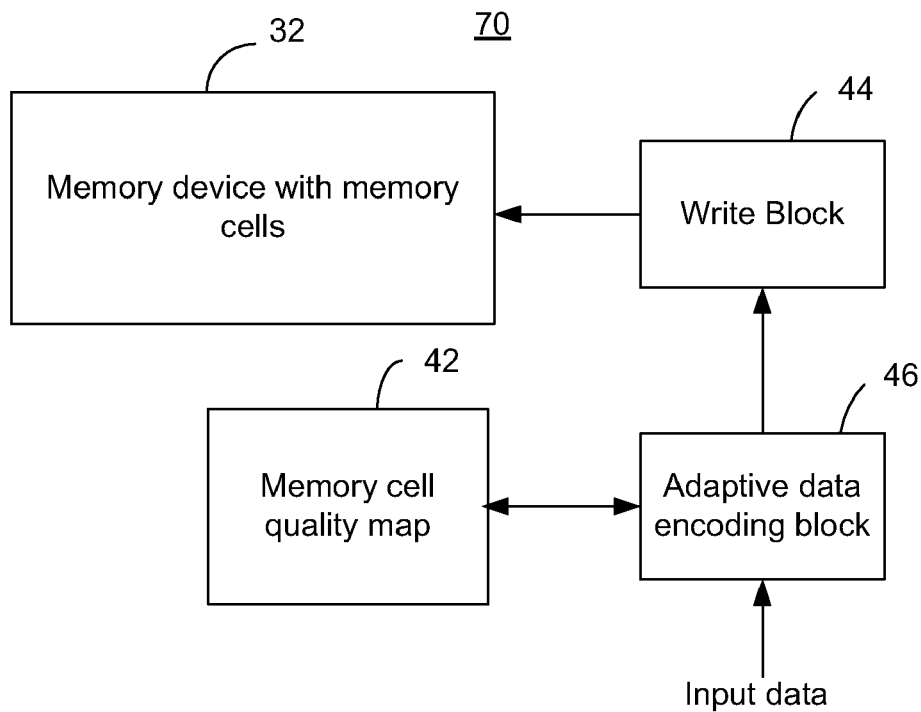
FIG. 5 illustrates a write portion of the system of FIG. 3, in accordance with various embodiments of the present invention.

Referring now to FIG. 4, an example of a read portion of the system 30 of FIG. 3 in accordance with various embodiments of the present invention is shown. The read portion 60 of the system 30 includes a read block 34 that may be configured for fetching data signals from the memory cells, a signal processing and detection block 36 that may be configured for translating analog signals to digital 0s and 1s, and an error correction and decoding block 38 that may be configured for decoding of the recovered user data including error corrections. In accordance with various embodiments of the present invention, the read portion 60 may further include memory cells quality monitoring block (herein "quality monitoring block") 40 that is configured to determine the qualities of groups of memory cells (as expressed by quality values) and a memory cell quality map (herein "quality map") 42, which may be configured to store the quality values determined by the quality monitoring block 40.

Operationally, the quality monitoring block 40 may, during a read operation of data previously stored in the memory device 32, receive input from the read block 34, the signal processing and detection block 36, and/or the error correction and decoding block 38 to determine the quality values of each group of memory cells included in the memory device 32. That is, depending on the type of quality values being determined, the quality monitoring block 40 may receive input during a read operation from the read block 34, the signal processing and detection block 36, and/or the error correction and decoding block 38 to determine the quality values. Note that, in this example, the quality value that is determined for a group of memory cells is the quality value of the group of memory cells at the time of a read operation of previously stored data in the group of memory cells and therefore, is not the quality value of that group of memory cells when the previously stored data was initially written and encoded into the group of memory cells. The significance of this will become more clear in the following description.

Upon determining the quality value of a group of memory cells, the quality value may then be stored into the quality map 42, which may store a plurality of quality values for a plurality of groups of memory cells in the memory device 32. As will be described in greater detail below, the quality values of the groups of memory cells stored in the quality map 42 may be used to facilitate the selection of coding schemes (i.e., algorithms) from a plurality of available coding schemes to be used for future writing and encoding of data to be written into the groups of memory cells, as well as for the eventual processing and decoding (i.e., error correcting) of such encoded data read from the memory device 32. That is, the quality values stored in the quality map 42 may be used initially during a write operation to select coding schemes for encoding data to be written to the memory device 32. The same quality values may then be used by the signal processing and detection block 36 and/or error correction and decoding block 38 during a read operation for properly processing and/or decoding (i.e., error correction) the encoded data read from the memory device 32 as depicted by reference 48 and 50 in FIGS. 3 and 4.

In accordance with various embodiments of the present invention, several alternative approaches may be employed in order to determine a quality (as expressed by a quality value or index) for a group of memory cells. In some instances, a quality value may be measured. Some possible approaches may include, for example, measuring:

1) The number of errors for a fixed number of pilot data (i.e., bits are known).
2) The number of errors corrected by the error correction code (ECC) as employed by the error correction decoding block for each logical block/sector (e.g., block of memory cells).
3) The average absolute values of log-likelihood ratios (LLRs).
4) The estimated noise variance.

To illustrate how these approaches may be used in order to determine a quality value of a group of memory cells, suppose approach 2 above is employed for determining the quality value. Assume further that the error correcting power of ECC is T, then it may be possible to form a quality monitoring function according to, for example, Table 1 as illustrated in FIG. 6.

In this example, if a group of memory cells (i.e., logical block/sector) were determined to have a quality index of "0", as depicted in Table 1, then such a group of memory cells would be determined to be a group of memory cells that are the most reliable (e.g., with the fewest errors). In contrast, if a group of memory cells were determined to have a quality index of "4," then such a group of memory cells would be determined to be a group of memory cells that have the worst reliability.

In this example, groups of memory cells having a quality index of 0 according to Table 1 would include those groups of memory cells having between 0 to T/10 errors. In contrast, those groups of memory cells having a quality index 4 would include those groups of memory cells having greater than T errors. In some embodiments of the present invention, those groups of memory cells having a quality index of 4 (e.g., indicating that they have the worse reliability) may be excluded from being used in the future for storing data. In such circumstances, current data that have already been stored in such memory cells may be transplanted to other memory cells after data recovery.

In the above example, each quality index may be associated with a particular coding scheme from a plurality of coding schemes. In some embodiments, a lower quality index (e.g., quality index 3 in the above example) may be associated with a coding scheme that has a relatively high amount of redundancy built-in relative to, for example, a coding scheme associated with a higher quality index, such as quality index 0 in the above example. The increased redundancy may be provided in order to accommodate for the higher amount of errors that may be present when data is retrieved from lower quality memory cells. Thus, the quality index may determine the type of coding scheme to be used for encoding data during a write operation.

For example, suppose a first quality index is determined for a first group of memory cells and a second quality index is determined for a second group of memory cells, wherein the first quality index is a higher quality value than the second quality index, thereby indicating that the first group of memory cells is of higher quality than the second group of memory cells. Based on the first and the second quality indices determined for the first and second groups of memory cells, a first and a second coding scheme may be used for encoding data to be written to the first and the second groups of memory cells, respectively, wherein the first coding scheme having an error correction capability that is lower than the error correction capability of the second coding scheme. Of course, and as previously described, when it is time to retrieve the encoded data from the memory cells, the quality values determined for the groups of memory cells may be used in order to facilitate the processing and decoding (including error correction) of the retrieved data.

After determining the quality values of each group of memory cells, the quality indices for each group of memory cells may then be stored in the quality map 42 for use during write operations as well as for read operations. In various embodiments, the quality map 42 may be embodied in a storage device and may take any physical form. For example, the quality map 42 may be specially partitioned memory cells in a storage device, or it may be dedicated other types of memory devices embedded in the storage device. For each group of memory cells in the memory device 32, two corresponding quality value entries may be stored at the same time (or at any given moment in time) in the quality map as illustrated in Table 2 of FIG. 7. In particular, Table 2 represents one possible exemplary structure of the quality map 42 in accordance with various embodiments of the present invention. In Table 2, the left column identifies the specific groups of memory cells (i.e., block/sector of memory cells), the middle column represents the "most recently measured quality index" for each group of memory cells, and the right column represents the "quality index used for writing" for each group of memory cells.

Referring back to FIG. 4, the quality monitoring block 40 may store, during a read operation of the memory device 32, quality indices (depicted as "most recently measured quality index" in Table 2 of FIG. 7) for each group of memory cells to the quality map 42 to be used in the future for writing data to the groups of memory cells. Also, and concurrently in some embodiments, the signal processing and detection block 36 and/or the error correction and decoding block 38 may use, during the same read operation, the "quality index used for writing" to facilitate the processing and/or decoding, respectively, of the "previously" encoded data read from the memory cells included in the memory device 32.

Thus, the quality values included in the "quality index used for writing" in Table 2 represent historical data relating to the quality values that were used for selecting the appropriate coding schemes for encoding data written to the memory cells. Subsequently, such quality values may then be retrieved from the quality map 42 to facilitate the processing and decoding of encoded data in the memory cells during read operations. In contrast, the quality values for the "most recently measured quality index" may be used during future write operations of the memory cells. Note that once a "most recently measured quality index" for a group of memory cells is used for encoding and writing data to the group of memory cells, such a quality index will replace the "current" quality value included in the "quality index used for writing."

In some embodiments of the present invention, the quality map 32 as illustrated by, for example, Table 2, may be initialized during product testing and/or initialization of the system 30. Under ideal conditions, all of the indices included in Table 2 would have quality index values of zero if all of the memory cells are working perfectly after initial product manufacture. However, in practice and because of defects and processing variations, some of the blocks/sectors may have lower quality indices than others.

FIG. 5 depicts an example of a write portion of the system 30 of FIG. 3 in accordance with various embodiments of the present invention. The write portion 70 of the system 30 includes a write block 44 for writing encoded data to the memory device 32, an adaptive data encoding block 46 to select, for each group of memory cells in the memory device 32, corresponding coding schemes from a plurality of coding schemes to be used for encoding inputted data to be written to the groups of memory cells, and the quality map 42 to store and to provide quality values of the groups of memory cells to the adaptive data encoding block 46.

In contrast to conventional write systems, which may employ a fixed encoder to encode data to be written to a memory device, the adaptive data encoding block 46 may select, based on the quality values of the groups of memory cells in the memory device 30, selective coding schemes from a plurality of available coding schemes to encode data to be written to the groups of memory cells of the memory device 30. In Table 2, the quality value used for selecting a coding scheme is the "most recently measured quality index." After such a quality value is used for selecting the appropriate coding scheme for encoding and writing data to a group of memory cells, the quality value used may then replace the previously determined and used quality value included in the "quality index used for writing" in Table 2. As a result, the "quality index used for writing" may be continuously updated whenever the quality value for the corresponding group of memory cells changes.

In order to appreciate the various types of available coding schemes that may be used in order to encode data to be written to a group of memory cells, the following examples with reference to Table 1 of FIG. 6 are provided. In Table 1, five indices (i.e., 0 to 4) are depicted. However, only four of the five quality indices (i.e., 0 to 3) may be associated with four different encoding algorithms (i.e., coding schemes) that may be used in order to encode data to be written to memory cells. A fifth coding scheme may not be needed because if a group of memory cells has a quality value of 4 indicating that the group of memory cells has very poor quality, that group of memory cells may not be used for storing data. Thus, in this example, there is no need for a fifth coding scheme.

For ease of presentation, assume that encoding algorithms A, B, C, and D, may be used for quality index 0, 1, 2, and 3, respectively. Assume also for the following examples that among the 4 coding algorithms, A is the weakest (with the lowest error correction capability) while D the strongest (with the highest error correction capability). For practical reasons, the different algorithms may be implemented using the same hardware circuit.

For example, if low density parity check (LDPC) codes are adopted, the different algorithms may correspond to encoding codes derived from the same mother LDPC code via variable puncturing. In another example, if Reed-Solomon (RS) codes are used, the different encoding algorithms may correspond to different codes shortened from the same RS code. For instance, using the same RS code operating on Galois field GF($2^8$), the original RS codeword length is 255 symbols of 8 bits for each symbol. For a fixed correction power T=20, one could choose the shortened codes (with the same T=20) of length 255, 235, 215 and 195, respectively, corresponding to algorithms A, B, C and D, respectively. Another realization could be obtained by simply fixing the codeword length (e.g., 255) and varying T from 20 to 30, 40, and 50, respectively, for algorithms A, B, C and D, respectively. It may also be possible to use codes derived from RS of GF($2^8$) with varying T values as well as varying codeword length for the desired different algorithms.

Figure 8:
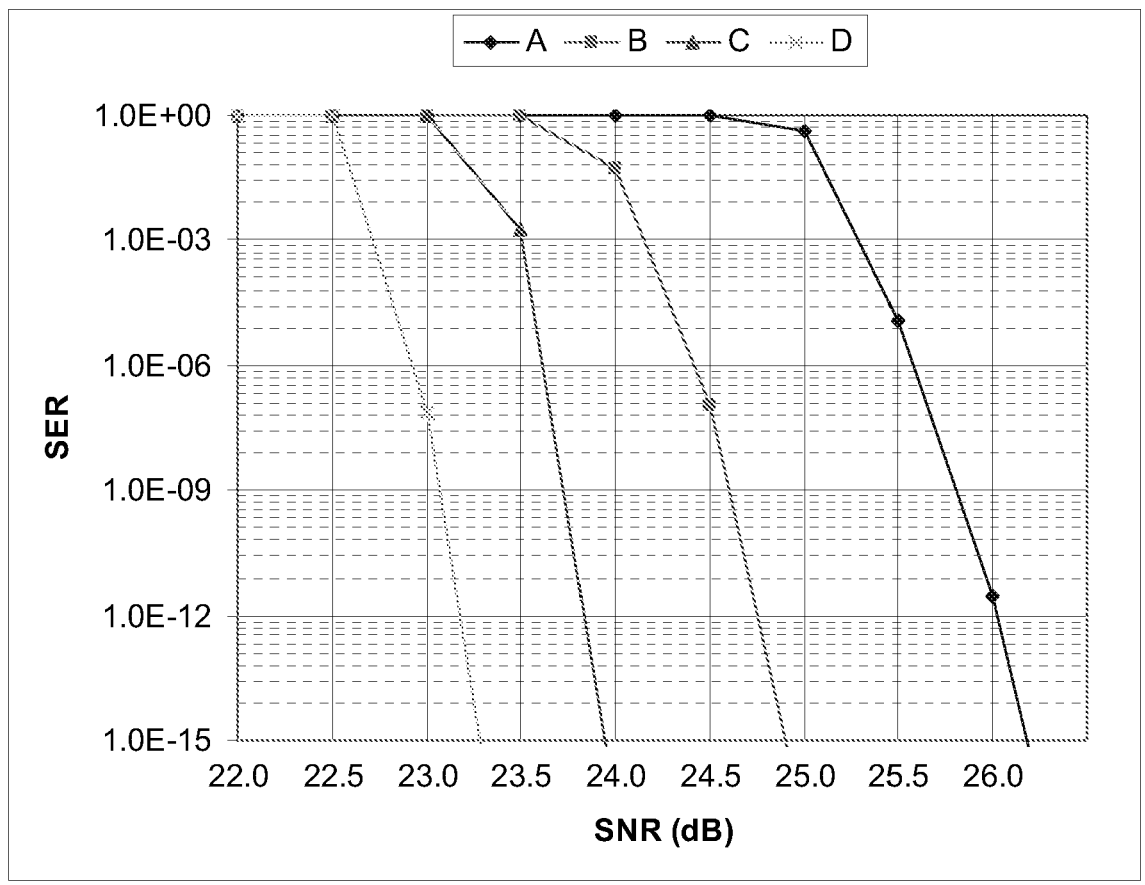
FIG. 8 illustrates a graphical example of when an adaptive data encoding block may be used, in accordance with various embodiments of the present invention.

FIG. 8 illustrates an example of when the adaptive data encoding block 46 may be used. In particular, FIG. 8 shows the estimated data sector error rate as a function of signal-to-noise ratio (SNR) when various coding algorithms (A, B, C and D, respectively) are used for a flash memory device. For example, groups or blocks of memory cells may be labeled (i.e., given a quality value or index) with measured SNR larger than 26 dB as quality index 0. Similarly, quality index 1, 2, 3, and 4 correspond to cells with SNR range of [24.7 dB, 26 dB], [23.8 dB, 24.7 dB], [23.2 dB, 23.8 dB], and below 23.8 dB, respectively. As a result, quality map 42 may include the indices to all the groups of memory cells in the flash memory device, which may have been populated during device initialization and reading.

When a block of user data is to be written to a group of memory cells included in the flash memory device, the write block 44 may obtain the corresponding quality index for that group of memory cells to which the data would be written and use the appropriate coding algorithms according to the quality index. For example, when the "most recently measured quality index" is 1 for the group of memory cells to be written, coding algorithm B may be used. After writing the encoded data, the "quality index used for writing" entry for the targeted group of memory cells may be updated to the value of 1. On the other hand, if the index is 3, algorithm D may be used and the table entry is updated to 3 after writing. By doing so, the flash memory device may ensure that the user perceived sector error rate may be below 10E-13.

Although specific embodiments have been illustrated and described herein, it will be appreciated by those of ordinary skill in the art and others, that a wide variety of alternate and/or equivalent implementations may be substituted for the specific embodiments shown in the described without departing from the scope of the present invention. This application is intended to cover any adaptations or variations of the embodiments discussed herein. Therefore, it is manifested and intended that various embodiments of the invention be limited only by the claims and the equivalents thereof.

What is claimed is:

1. An apparatus, comprising:
a memory device including a plurality of memory cells;
a write block configured to write encoded data to the memory cells; and
an adaptive data encoding block configured to select a first coding scheme from a plurality of coding schemes to encode data to be written to a first group of one or more memory cells in the memory device, the selection of the first coding scheme being based at least in part on a first quality value of the first group of one or more memory cells, the first quality value being indicative of a quality of the first group of one or more memory cells.

2. The apparatus of claim 1, wherein the adaptive data encoding block is further configured to select a second coding scheme from the plurality of coding schemes to encode data to be written to a second group of one or more memory cells in the memory device, the selection of the second coding scheme being based at least in part on a second quality value of the second group of one or more memory cells, the second quality value being indicative of a quality of the second group of one or more memory cells.

3. The apparatus of claim 2, wherein the first and second coding schemes are different coding schemes.

4. The apparatus of claim 2, wherein if the first quality value of the first group of one or more memory cells is a higher quality value than the second quality value of the second group of one or more memory cells, then the first coding scheme is selected such that the first coding scheme has a lower error correction capability than the second coding scheme.

5. The apparatus of claim 4, further comprising a quality map to provide the quality values for the first group of one or more memory cells and the second group of one or more memory cells.

6. The apparatus of claim 1, further comprising a quality map to provide the first quality value for the first group of one or more memory cells.

7. The apparatus of claim 6, wherein said quality map is configured to store and provide a plurality of quality values for a plurality of groups of one or more memory cells in the memory device.

8. The apparatus of claim 7, wherein said quality map is configured to store and provide at least one quality value for at least one group of one or more memory cells in the memory device that indicates that the at least one group of one or more memory cells is or are to be excluded from being used.

9. The apparatus of claim 1, wherein the memory cells of the memory device are flash memory cells.

10. An apparatus, comprising:
a memory device including a plurality of memory cells;
a read block configured to read the memory cells; and
a data quality monitoring block configured to determine a first quality value of a first group of one or more memory cells included in the memory device, the determined first quality value being indicative of a quality of the first group of one or more memory cells and to be used at least in part for selecting a first coding scheme for writing data to the first group of one or more memory cells.

11. The apparatus of claim 10, wherein said data quality monitoring block is configured to determine the first quality value of the first group of one or more memory cells based, at least in part, on the reading of the first group of one or more memory cells by the read block.

12. The apparatus of claim 10, further comprising a quality map configured to include the first quality value of the first group of one or more memory cells determined by the data quality monitoring block.

13. The apparatus of claim 12, wherein said quality map is further configured to include, at any given moment in time, an additional quality value of the first group of one or more memory cells along with the first quality value of the first group of one or more memory cells, the additional quality value being stored in the quality map prior to storing the first quality value into the quality map.

14. The apparatus of claim 13, further comprising a signal processing and detection block to process data read by the read block from the first group of one or more memory cells, and an error correction and decoding block to decode data read by the read block from the first group of one or more memory cells.

15. The apparatus of claim 14, wherein said quality map is further configured to provide the additional quality value to the signal processing and detection block to facilitate said processing of the data.

16. The apparatus of claim 14, wherein said quality map is further configured to provide the additional quality value to the error correction and decoding block to facilitate said decoding of the data.

17. The apparatus of claim 10, wherein the data quality monitoring block is further configured to determine at least one quality value for at least one group of one or more memory cells in the memory device that indicates that the at least one group of one or more memory cells is or are to be excluded from being used.

18. The apparatus of claim 10, wherein the data quality monitoring block is further configured to determine a second quality value of a second group of one or more memory cells in the memory device based at least in part on the reading of the memory cells by the read block, the second quality value being indicative of the quality of the second group of one or more memory cells and to be used at least in part for selecting a coding scheme for writing data to the second group of one or more memory cells.

19. The apparatus of claim 18, further comprising a quality map configured to store the quality values of the first group of one or more memory cells and the second group of one or more memory cells determined by the data quality monitoring block.

20. The apparatus of claim 10, wherein the memory cells of the memory device are flash memory cells.

21. An apparatus, comprising:
a memory device including a plurality of memory cells; and
a quality map having stored therein a first quality value for a first group of one or more memory cells of the memory device, the first quality value to be used to facilitate selection of a first coding scheme from a plurality of coding schemes for encoding data to be written to the first group of one or more memory cells, the first quality value being indicative of a quality of the first group of one or more memory cells.

22. The apparatus of claim 21, wherein the quality map further having stored therein a second quality value for a second group of one or more memory cells of the memory device, the second quality value to be use to facilitate selection of a second coding scheme from the plurality of coding schemes for encoding data to be written to the second group of one or more memory cells.

23. The apparatus of claim 22, wherein if the first quality value is a higher quality value than the second quality value, then the first coding scheme is selected such that the first coding scheme has a lower error correction capability than the second coding scheme.

24. The apparatus of claim 21, wherein the memory device has multiple groups of one or more memory cells, and said quality map is configured to include for each group of one or more memory cells a corresponding quality value.

25. The apparatus of claim 24, wherein the quality map is further configured to additionally include, for each group of one or more memory cells and at any given moment in time, an additional corresponding quality value along with the corresponding quality value, the additional corresponding quality values of the groups of one or more memory cells being stored in the quality map prior to the storage of the corresponding quality values of the groups of one or more memory cells.

26. The apparatus of claim 21, wherein the quality map is configured to provide to a signal processing and detection block and/or an error correction and decoding block the first quality value to facilitate processing and/or decoding, respectively, of data stored in the first group of one or more memory cells.

27. An apparatus, comprising:
a memory device including a plurality of memory cells;
a data quality monitoring block configured to determine a first quality value of a first group of one or more memory cells included in the memory device, the determined first quality value being indicative of a quality of the first group of one or more memory cells; and
an adaptive data encoding block configured to select a first coding scheme from a plurality of coding schemes to encode data to be written to the first group of one or more memory cells in the memory device, the selection of the first coding scheme being based at least in part on the determined first quality value of the first group of one or more memory cells.

28. The apparatus of claim 27, wherein the data quality monitoring block is further configured to determine a second quality value of a second group of one or more memory cells in the memory device, the second quality value being indicative of the quality of the second group of one or more memory cells.

29. The apparatus of claim 28, wherein the adaptive data encoding block is further configured to select a second coding scheme from the plurality of coding schemes to encode data to be written to the second group of one or more memory cells in the memory device, the selection of the second coding scheme being based at least in part on the second quality value of the second group of one or more memory cells.

30. The apparatus of claim 29, wherein if the first quality value is a higher quality value than the second quality value, then the first coding scheme is selected such that the first coding scheme has a lower error correction capability than the second coding scheme.

31. The apparatus of claim 27 further comprising a read block configured to read the memory cells, and wherein the data quality monitoring block is operatively coupled to the memory device via the read block.

32. The apparatus of claim 31, further comprising a quality map configured to include the first quality value of the first group of one or more memory cells determined by the data quality monitoring block.

33. The apparatus of claim 32, wherein said quality map is further configured to include, at any given moment in time, an additional quality value of the first group of one or more memory cells along with the first quality value of the first group of one or more memory cells, the additional quality value being stored in the quality map prior to storing the first quality value into the quality map.

34. The apparatus of claim 33, further comprising a signal processing and detection block configured to process data read by the read block from the first group of one or more memory cells, and an error correction and decoding block configured to decode data read by the read block from the first group of one or more memory cells.

35. The apparatus of claim 34, wherein said quality map is further configured to provide the additional quality value to the signal processing and detection block to facilitate said processing of the data.

36. The apparatus of claim 34, wherein said quality map is further configured to provide the additional quality value to the error correction and decoding block to facilitate said decoding of the data.

37. The apparatus of claim 27, further comprising a quality map configured to store and to provide the first quality value for the first group of one or more memory cells.

38. The apparatus of claim 37, wherein said quality map is further configured to store and to provide a plurality of quality values for a plurality of groups of one or more memory cells in the memory device.

39. The apparatus of claim 38, wherein said quality map is further configured to store and to provide at least one quality value for at least one group of one or more memory cells in the memory device that indicates that the at least one group of one or more memory cells is, or are, to be excluded from being used.

40. A method, comprising:
determining a first quality value of a first group of one or more memory cells included in a memory device, the determined first quality value being indicative of a quality of the first group of one or more memory cells; and
selecting a first coding scheme from a plurality of coding schemes to encode data to be written to the first group of one or more memory cells, the selection of the first coding scheme being based at least in part on the determined first quality value of the first group of one or more memory cells.

41. The method of claim 40, further comprising determining a second quality value of a second group of one or more memory cells in the memory device, the second quality value being indicative of the quality of the second group of one or more memory cells; and
selecting a second coding scheme from the plurality of coding schemes to encode data to be written to the second group of one or more memory cells, the selection of the second coding scheme being based at least in part on the second quality value of the second group of one or more memory cells.

42. The method of claim 41, wherein if the first quality value is a higher quality value than the second quality value, then the first coding scheme is selected such that the first coding scheme has a lower error correction capability than the second coding scheme.

43. The method of claim 40, further comprising storing said first quality value in a quality map.

44. The method of claim 43, further comprising providing the stored first quality value in the quality map to a signal processing and detection block to facilitate processing of data read from the first group of one or more memory cells.

45. The method of claim 43, further comprising providing the stored first quality value in the quality map to an error correction and decoding block to facilitate decoding data read from the first group of one or more memory cells.

46. The method of claim 40, further comprising determining at least one quality value for at least one group of one or more memory cells in the memory device that indicates that the at least one group of one or more memory cells is, or are, to be excluded from being used.

47. An apparatus, comprising:
means for determining a first quality value of a first group of one or more memory cells included in a memory device, the determined first quality value being indicative of a quality of the first group of one or more memory cells; and
means for selecting a first coding scheme from a plurality of coding schemes to encode data to be written to the first group of one or more memory cells, the selection of the first coding scheme being based at least in part on the determined first quality value of the first group of one or more memory cells.

48. The apparatus of claim 47, further comprising means for determining a second quality value of a second group of one or more memory cells in the memory device, the second quality value being indicative of the quality of the second group of one or more memory cells; and
means for selecting a second coding scheme from the plurality of coding schemes to encode data to be written to the second group of one or more memory cells, the selection of the second coding scheme being based at least in part on the second quality value of the second group of one or more memory cells.

49. The apparatus of claim 48, wherein if the first quality value is a higher quality value than the second quality value, then the first coding scheme is selected such that the first coding scheme has a lower error correction capability than the second coding scheme.

50. The apparatus of claim 47, further comprising means for storing said first quality value.

51. The apparatus of claim 50, further comprising means for signal processing and detection, and said means for storing being configured to provide the stored first quality value to the means for signal processing and detection in order to facilitate processing of data read from the first group of one or more memory cells.

52. The apparatus of claim 50, further comprising means for error correction and decoding, and said means for storing being configured to provide the stored first quality value to the means for error correction and decoding to facilitate decoding of data read from the first group of one or more memory cells.

53. The apparatus of claim 47, further comprising means for determining at least one quality value for at least one group of one or more memory cells in the memory device that indicates that the at least one group of one or more memory cells is, or are, to be excluded from being used.

* * * * *